(12) United States Patent
Zürcher et al.

(10) Patent No.: US 8,066,805 B2
(45) Date of Patent: Nov. 29, 2011

(54) METAL INKS, METHODS OF MAKING THE SAME, AND METHODS FOR PRINTING AND/OR FORMING METAL FILMS

(75) Inventors: Fabio Zürcher, Brisbane, CA (US); Aditi Chandra, Los Gatos, CA (US); Wenzhuo Guo, Cupertino, CA (US); Erik Scher, San Francisco, CA (US); Mao Takashima, Cupertino, CA (US); Joerg Rockenberger, San Jose, CA (US)

(73) Assignee: Kovio, Inc., Milpitas, CA (US)

( * ) Notice: Subject to any disclaimer, the term of this patent is extended or adjusted under 35 U.S.C. 154(b) by 712 days.

(21) Appl. No.: 12/131,002

(22) Filed: May 30, 2008

(65) Prior Publication Data
US 2009/0004370 A1   Jan. 1, 2009

Related U.S. Application Data

(60) Provisional application No. 60/932,392, filed on May 30, 2007.

(51) Int. Cl.
*C23C 16/00* (2006.01)
*C09D 1/00* (2006.01)
*B05D 3/00* (2006.01)

(52) U.S. Cl. .................. 106/1.05; 106/286.1; 106/286.4; 427/343

(58) Field of Classification Search .................. 106/1.05, 106/286.1, 286.4; 427/343
See application file for complete search history.

(56) References Cited

U.S. PATENT DOCUMENTS

| | | | | |
|---|---|---|---|---|
| 4,945,072 | A * | 7/1990 | Burns et al. | 501/88 |
| 6,194,032 | B1 * | 2/2001 | Svedberg et al. | 427/466 |
| 2005/0006339 | A1 * | 1/2005 | Mardilovich et al. | 427/443.1 |
| 2005/0174407 | A1 * | 8/2005 | Johnson et al. | 347/95 |

* cited by examiner

*Primary Examiner* — Helene Klemanski
(74) *Attorney, Agent, or Firm* — The Law Offices of Andrew D. Fortney; Andrew D. Fortney; Sharon E. Brown Turner

(57) ABSTRACT

Printable metal formulations, methods of making the formulations, and methods of coating or printing thin films from metal ink precursors are disclosed. The metal formulation generally includes one or more Group 4, 5, 6, 7, 8, 9, 10, 11, or 12 metal salts or metal complexes, one or more solvents adapted to facilitate coating and/or printing of the formulation, and one or more optional additives that form (only) gaseous or volatile byproducts upon reduction of the metal salt or metal complex to an elemental metal and/or alloy thereof. The formulation may be made by combining the metal salt(s) or metal complex(es) and the solvent(s), and dissolving the metal salt(s) or metal complex(es) in the solvent(s) to form the formulation. Thin films may be made by coating or printing the metal formulation on a substrate; removing the solvents to form a metal-containing precursor film; and reducing the metal-containing precursor film.

39 Claims, 1 Drawing Sheet

METAL INKS, METHODS OF MAKING THE SAME, AND METHODS FOR PRINTING AND/OR FORMING METAL FILMS

RELATED APPLICATIONS

This application claims the benefit of U.S. Provisional Application No. 60/932,392, filed May 30, 2007, which is incorporated herein by reference in its entirety.

FIELD OF THE INVENTION

The present invention generally relates to the field of thin films, particularly continuous or patterned metal thin films. More specifically, embodiments of the present invention pertain to methods of forming thin films from metal ink precursors, printable metal formulations for forming such thin films, and methods of forming such printable formulations.

SUMMARY OF THE INVENTION

Aspects of the present invention relate to metal formulations for forming thin films from metal ink precursors, methods of forming such printable metal formulations, and methods of forming thin films from metal ink precursors. Using such formulations and methods enables the printing of a pure metal film using a metal precursor and reducing agent that generally do not leave substantially adverse levels of impurities and/or residues in the film. In one aspect, the present invention concerns an ink formulation that generally consists essentially of one or more Group 4, 5, 6, 7, 8, 9, 10, 11, or 12 metal salt(s) and/or metal complex(es), one or more solvents adapted to facilitate coating and/or printing of the formulation, and optionally, one or more additives that form gaseous or volatile byproducts upon reduction of the metal salt or metal complex to an elemental metal or alloy thereof. In a further embodiment, the ink formulation may further consist essentially of (or the additive may comprise) an anion source, adapted to facilitate dissolution of the metal salt or metal complex in the solvent.

In various preferred embodiments of the ink formulation, the Group 4, 5, 6, 7, 8, 9, 10, 11, or 12 metal salt comprises a palladium, nickel, cobalt, or platinum salt. The solvent(s) may comprise water, an organic solvent, a mixture of organic solvents, or a mixture of one or more organic solvents and water. On the other hand, in further embodiments, the formulation may be substantially anhydrous. In such anhydrous formulations, water (to the extent initially present) is removed or minimized, in which case water is generally not added (although it could be added, if desired, for example to dilute a concentrated ink after manufacturing and/or shipping, but prior to printing).

In those formulations that include water, the additive(s) and/or co-solvent(s) may be chosen from molecules and/or compounds that (a) are either completely miscible with water or have good solubility in water; (b) improve printing of water-based inks by modifying the surface tension, viscosity, vapor pressure and/or evaporation kinetics of the ink (relative to the same formulation without the additive and/or co-solvent); (c) have low (or substantially no) spreadability on $SiO_2$ surfaces (e.g., thermal, deposited, chemical, or native $SiO_2$); (d) evaporate during the printing process and/or subsequent drying and curing steps, and thus, have little or no interference with formation of metal and/or metal silicide (e.g., palladium and/or palladium silicide) films; (e) have solubility in organic solvents (or the capability of such solubility) to widen the printing process window; (f) have certain solubility for an active ingredient (e.g., a metal precursor such as $PdCl_2$) in order to provide a predetermined final thickness for the metal (e.g., Pd); and (g) have little interaction with and do not form compounds (e.g., $SiO_x$, SiC) with the underlying substrate (e.g., silicon or $SiO_2$) that may have a detrimental effect in the process or device. Preferred examples for such additive/co-solvent molecules include relatively low molecular weight alcohols and esters, such as diethylene glycol butyl ether (butyl carbitol), tetrahydrofurfuryl alcohol, ethylene glycol, isopropanol, 2-butanol, ethyl acetate, hexanol, heptanol, and 2-pentanol.

In another aspect, the method of making a metal-containing formulation comprises the steps of (1) combining one or more Group 4, 5, 6, 7, 8, 9, 10, 11, or 12 metal salt(s) and/or metal complex(es) and one or more solvents adapted to facilitate coating and/or printing of the formulation, and (2) dissolving the metal salt(s) and/or metal complex(es) in the one or more solvents to form the formulation, the formulation consisting essentially of components that produce gaseous or volatile byproducts upon reduction of the metal salt(s) and/or metal complex(es) to an elemental metal or alloy. In various embodiments, the Group 4, 5, 6, 7, 8, 9, 10, 11, or 12 metal salt may comprise a palladium, nickel, cobalt, or platinum salt.

In one embodiment, the metal-containing formulation may be made by dissolving the Group 4, 5, 6, 7, 8, 9, 10, 11, or 12 metal salt in an amount of aqueous HX and/or $NH_4X$ providing a solution containing at least 1 wt. % of the metal, where X is a halide or pseudohalide. Then, one or more organic solvents adapted to facilitate coating and/or printing of the formulation may be added to the solution. Water may be removed from the formulation either before or after adding the organic solvent(s). In one variation, the water may be removed by adding molecular sieves to the formulation after the additive(s) and/or co-solvent(s) are added to the solution. In various implementations, the metal salt comprises a metal halide, pseudohalide, nitrate, or sulfate.

The present invention also relates to a method of fabricating a metal film on a substrate by coating or printing a formulation comprising one or more Group 4, 5, 6, 7, 8, 9, 10, 11, or 12 metal salt(s) and/or metal complex(es), one or more optional additives that form gaseous or volatile byproducts upon reduction of the metal salt or metal complex to an elemental metal or alloy thereof (e.g., aqueous HX), and one or more solvents on the substrate. After coating or printing the formulation, the residual solvents are removed to form a metal-containing precursor film. The resulting metal-containing precursor film is subsequently reduced (e.g., by exposing the metal-containing precursor film to a reducing agent) for a length of time sufficient to form the metal or alloy film. Thus, a continuous or patterned metal film may be formed using a metal precursor ink and subsequent exposure to a reducing agent without leaving substantial amounts of impurities and/or residues in the film (e.g., $PdCl_2 + H_2 \rightarrow Pd + HCl$ [gas]). In various embodiments, X may be a halide or pseudohalide, among others. In certain preferred embodiments, the formulation comprises aqueous HCl and/or $NH_4Cl$. In further embodiments, exposing the metal-containing precursor film to the reducing agent further comprises heating the substrate having the metal-containing precursor film thereon to a temperature of at least 100° C. Optionally, the sample could be cured at low temperatures (e.g., 150° C.) for both drying the metal precursor and to reduce the metal precursor to the elemental metal film. Furthermore, the Group 4, 5, 6, 7, 8, 9, 10, 11, or 12 metal salt may comprise a palladium, nickel, cobalt, or platinum salt.

The present invention provides ink formulations and methods that enable the formation of metal and metal silicide films (e.g., palladium and palladium silicide) by printing or coating a metal (e.g., palladium) precursor. Palladium silicides are particularly advantageous when compared with other silicide-forming metals because they can be formed even in the presence of a native or chemical oxide on the silicon surface, thus simplifying the process for forming the metal silicide. Additionally, these methods enable the use of the $PdCl_2$—and possibly other metal precursor-containing inks for printing seed layers for subsequent electroless plating of metals on non-conductive substrates.

These and other advantages of the present invention will become readily apparent from the detailed description of preferred embodiments below.

DETAILED DESCRIPTION OF THE PREFERRED EMBODIMENTS

Figure 1:
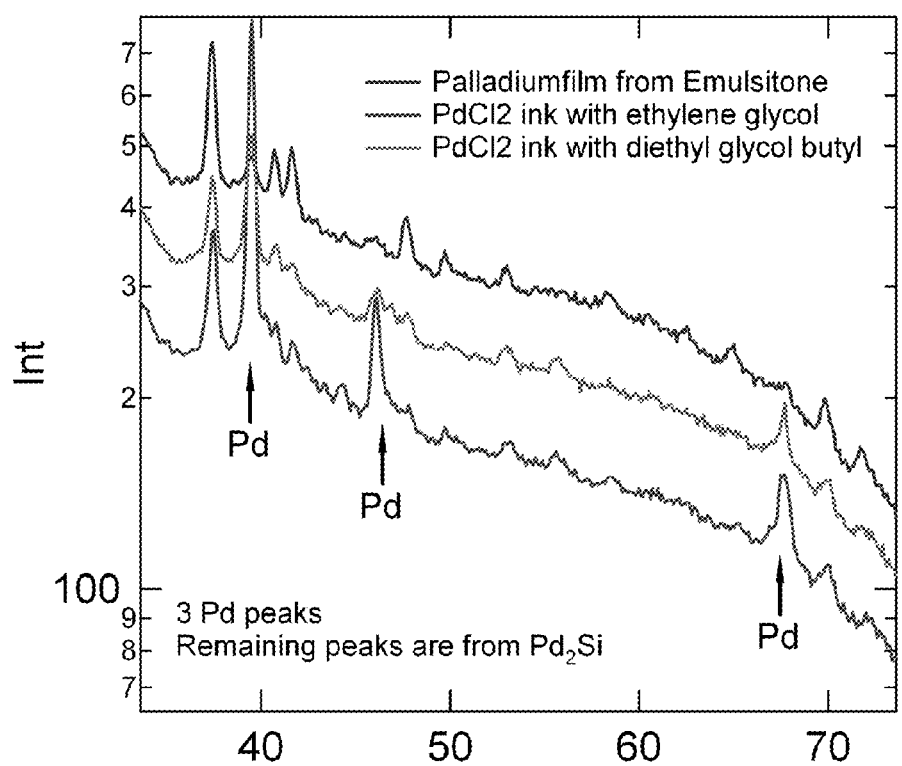
FIG. 1 is a graph showing x-ray diffraction (XRD) data for an embodiment of the present invention using a palladium ink, inkjet printed onto silicon and annealed to form $Pd_2Si$.

Reference will now be made in detail to preferred embodiments of the invention. While the invention will be described in conjunction with the following preferred embodiments, it will be understood that the description is not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

For the sake of convenience and simplicity, the terms "$C_a$—$C_b$ alkyl," "$C_a$—$C_b$ alkoxy," etc. shall refer to both linear and, when the range from a to b encompasses three (3) or more carbon atoms, branched groups. Unless otherwise indicated, the terms "cyclo-" and "cyclic" refer to both mono- and polycyclic species. For the sake of briefness, the terms "halo-," "halogen," "halide" and grammatical derivations thereof may describe halogens as defined in the Periodic Table of Elements (F, Cl, Br, and I) and halogen-like species (e.g., species that form stable monovalent anions, often called pseudohalides) such as methanesulfonate (OMs), trifluoromethanesulfonate (OTf), toluenesulfonate (OTs), tetrafluoroborate ($BF_4$), hexafluorophosphate ($PF_6$), etc. Furthermore, with regard to certain materials, the phrase "consisting essentially of" does not exclude intentionally added dopants, which may give the material to which the dopant is added (or the element or structure formed from such material) certain desired (and potentially quite different) physical and/or electrical properties.

In the present invention, the term "deposit" (and grammatical variations thereof) is intended to encompass all forms of deposition, including blanket deposition (e.g., CVD and PVD), coating, and printing. In various embodiments of the method of coating or printing a metal film on a substrate, coating or printing may comprise inkjetting, gravure-, screen-, offset-, or flexo-printing, spray-coating, spin coating, slit coating, extrusion coating, dip coating, meniscus coating, microspotting and/or pen-coating the formulation onto the substrate. Also, for convenience and simplicity, the terms "part," "portion," and "region" may be used interchangeably but these terms are also generally given their art-recognized meanings. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The present invention concerns ink formulations, methods of making ink formulations, and methods that enable the formation of a metal or metal silicide (preferably in selected areas of a substrate) by printing or coating a metal precursor. One ink formulation generally comprises aqueous HX, where X is a halide or pseudohalide (it being noted that $NH_4X$ comprises $HX+NH_3$), a Group 8, 9, 10, 11, or 12 metal salt, and one or more additives and/or co-solvents adapted to facilitate coating and/or printing of the formulation. However, in general, the formulation comprises a Group 4, 5, 6, 7, 8, 9, 10, 11, or 12 metal salt or metal complex, an organic solvent, mixture of organic solvents, or mixture of $H_2O$ and organic solvent(s) adapted to facilitate coating and/or printing of the formulation.

One method of making such ink formulations generally comprises the steps of (a) combining a Group 4, 5, 6, 7, 8, 9, 10, 11, or 12 metal salt or metal complex and one or more solvents adapted to facilitate coating and/or printing of the formulation, and (b) dissolving the metal salt or metal complex in the one or more solvents to form the formulation, the formulation consisting essentially of components that produce gaseous or volatile byproducts upon reduction of the metal salt or metal complex to an elemental metal or alloy thereof. When the adduct and/or reaction product is made by dissolving a Group 4, 5, 6, 7, 8, 9, 10, 11, or 12 metal salt or complex in an aqueous solution of an anion source (e.g., HX), the method may further comprise removing water from the solution, either after combining the organic solvent(s) with the metal salt or complex solution or before combining the organic solvent(s) with the metal complex (i.e., the adduct). The formulations made by such alternate methods may be substantially anhydrous. As such, the amount of water in the formulation may be minimized.

A further aspect of the invention concerns a method of coating or printing a metal film on a substrate comprising the steps of (a) coating or printing a formulation on the substrate, the formulation consisting essentially of a Group 4, 5, 6, 7, 8, 9, 10, 11, or 12 metal salt or metal complex, one or more solvents, and one or more optional additives that form gaseous or volatile byproducts upon reduction of the metal salt or metal complex to an elemental metal or alloy, (b) removing the solvents to form a metal-containing precursor film, and (c) reducing the metal-containing precursor film to form the metal or alloy film. In a preferred embodiment, the formulation is printed (e.g., inkjet printed) onto the substrate.

In some embodiments, the metal salt or metal complex may comprise a salt or complex of a silicide-forming metal (e.g., Ti, Ta, Cr, Mo, W, Ni, Co, Pd, or Pt), preferably a Group 6-12 silicide-forming metal (e.g., Mo, W, Ni, Co, Pd, or Pt), and more preferably a Group 9-10 silicide-forming metal (e.g., Ni, Co, Pd, or Pt). Palladium silicides are particularly advantageous when compared to other silicide-forming metals, because palladium silicides may be formed even in the presence of a native or chemical oxide on a silicon surface. This is important for forming structures such as ohmic contacts between doped silicon and metals, where native or chemical oxides formed on the silicon surface could interfere with silicide formation, resulting in reduced conductivity and/or performance of the contact. According to the present invention, a palladium or other silicide-forming metal precursor can be selectively deposited by a printing process in only the areas where the silicide is desired. Alternatively, a Pd or other silicide-forming metal film may be coated onto the substrate, and a Pd or other metal silicide selectively formed at the interface with silicon. Any excess Pd/metal film remaining can be easily removed using an etch process that is selective for the elemental metal relative to the metal silicide.

In one embodiment, the present metal ink formulation preferentially wets an exposed silicon surface relative to an exposed silicon oxide surface onto which it is printed. Preferential wetting generally takes place anytime one surface has a higher surface energy than the adjacent surface. Most liquids tend to form balls or spheres on the surface at contact angles greater than 30°. In the present invention, the contact angle of the present metal ink formulation on silicon is preferably significantly lower (e.g., at least 5°, 10°, 15°, 20°, or any other angle of at least 5 or 10° less) than the contact angle on $SiO_2$ (e.g., thermal oxide or CVD oxide, e.g., from TEOS or silane). Additionally, to increase the preferential wetting effects, the surface tension of the ink formulation should be above 25 dynes/cm (or any other minimum value greater than 25 dynes/cm). In an alternative embodiment, the method advantageously involves selective dewetting of the formulation from a surface comprising a silicon oxide, onto a surface containing or consisting essentially of elemental silicon.

In the alternative, the metal precursor ink can be coated or printed (optionally with less accuracy) over the entire electronic device (e.g., thin film transistor, diode, capacitor, etc.), and after annealing to form the silicide, the relatively small amount of extra metal that does not form silicide can be selectively removed with an etch solution or other solution that can selectively remove elemental metal, but not the metal silicide. For example, palladium can be selectively removed with a $KI/I_2/H_2O$ etch solution (which leaves palladium silicide relatively unetched). This method has the advantages of using a less accurate and less expensive printer to deposit the metal precursor onto the substrate surface.

The present embodiments may also use a patterned (e.g., printed) silicon layer to form local interconnects, converting the patterned silicon layer into a metal silicide. If the metal is chosen so that its silicide has a conductivity at or above a minimum threshold, a high-resolution printing step for forming a metal local interconnect layer may be eliminated.

Commercially available palladium precursor materials are generally not compatible with certain printing techniques (e.g., inkjet printing) or with an "all-printed" process (e.g., as described in U.S. patent application Ser. Nos. 11/452,108, 11/888,949, and 11/818,078, filed Jun. 12, 2006, Jun. 12, 2007, and Aug. 3, 2007, respectively. However, the present formulations are compatible with such printing processes. Furthermore, use of the present ink formulations (instead of metal [e.g., palladium] nanoparticle-based inks, inks containing palladium or other metal complexes, or other commercially available formulations) results in the almost total absence of residues and/or film impurities remaining after reduction and annealing. The present metal precursor inks generally comprise a water-based and/or organic solution of $MX_n$ or $M(L)_pX_n$, where X is a halide, pseudohalide, nitrate, sulfate, formate, acetate, cyanate, isocyanate, alkoxide, and/or diketonate, and n is equal to a formal charge of M plus any associated cations that are present, divided by a formal charge of X (e.g., an adduct of $PdCl_2$ and HCl), where the solvents facilitate coating and/or printing on a silicon and/or $SiO_2$ surface. The only non-volatile component in such an example is $PdCl_2$, which, in the presence of hydrogen or forming gas (typically, 5% hydrogen in argon or nitrogen), forms elemental Pd and HCl gas, even at temperatures as low as room temperature. Therefore, the present ink formulations are able to form elemental metals such as palladium, and thus can be used (1) for forming a silicide, (2) as a seed for electroless plating of metals on non-conductive substrates, and/or (3) for any other application in which palladium (or another metal exhibiting similar characteristics and/or qualities) is useful or required.

The invention, in its various aspects, will be explained in greater detail below with regard to exemplary embodiments.

Exemplary Ink Formulations

A first aspect of the present invention relates to an ink formulation. The formulation generally comprises a Group 4, 5, 6, 7, 8, 9, 10, 11, or 12 metal salt or metal complex, one or more solvents adapted to facilitate coating and/or printing of the formulation, and one or more optional additives that form gaseous or volatile byproducts upon reduction of the metal salt or metal complex to an elemental metal and/or an alloy thereof. Preferably, the metal salt or metal complex, and any additive(s) that may be present, form substantially only gaseous or volatile byproducts upon reduction of the metal salt or metal complex to the elemental metal or alloy. A volatile solvent, byproduct or other compound or reaction product generally refers to a chemical species having a boiling point of about 100° C. or less at a pressure of 760 torr. Also, the solvent(s) are preferably adapted to facilitate printing (especially inkjet printing) of the formulation. To facilitate dissolution of the metal salt or metal complex in the solvent or solvent mixture, the formulation may further comprise an anion source.

In various embodiments, the Group 4, 5, 6, 7, 8, 9, 10, 11, or 12 metal salt or metal complex has the formula $MX_n$ or $M(L)_pX_n$, respectively, where M is the Group 4, 5, 6, 7, 8, 9, 10, 11, or 12 metal; X is a halide, pseudohalide, nitrate, sulfate, formate, acetate, cyanate, isocyanate, alkoxide and/or diketonate; n is equal to a formal charge of M plus any associated cations that are present, divided by a formal charge of X; L is selected from the group consisting of $NH_3$, $NR_3$ (where each R may be independently H, alkyl [e.g., $C_1$-$C_6$ alkyl], aryl [e.g., $C_6$-$C_{12}$ aryl], etc.), $H_2O$, CO, NO, $N_2$, $H_2S$, $C_2H_4$, $C_6H_6$, CN, NC, $PH_3$, $PF_3$, $PR_3$ (where each R may be independently H, alkyl [e.g., $C_1$-$C_6$ alkyl], aryl [e.g., $C_6$-$C_{12}$ aryl], etc.) and volatile O- and/or N-containing organic solvents (preferably $NH_3$ and/or $H_2O$); and p is an integer equal to a number of coordination sites on M, minus the number of coordination sites occupied by $X_n$. For example, the Group 4-12 metal may comprise Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, or a mixture thereof. When the ligand L is a volatile O— and/or N-containing organic solvent, it may be one or more of the organic solvents described herein that has one or more oxygen and/or nitrogen atoms therein and a boiling point at 760 torr of no more than 100° C., preferably no more than 80° C. The ligand is preferably highly volatile and/or easily vaporized so that it can be cleanly removed from the film upon reduction of the metal salt and/or metal complex.

In various preferred embodiments, the Group 4, 5, 6, 7, 8, 9, 10, 11, or 12 metal salt or metal complex may comprise a Group 8, 9, 10, 11, or 12 metal halide, pseudohalide, nitrate, or sulfate of the formula $MX_n$. The Group 8-12 metal may comprise Ru, Os, Co, Rh, Ir, Ni, Pd, Pt, Cu, Ag, Au, Zn, Cd, or a mixture thereof. In various implementations, the metal salt or metal complex may comprise a palladium, nickel, cobalt, or platinum salt (e.g., a palladium salt such as $PdX_2$) or a metal halide (e.g., $MX_n$, where X is F, Cl, or Br).

In exemplary embodiments, the palladium salt comprises a palladium halide, a palladium pseudohalide, palladium nitrate, and/or palladium sulfate. For example, the palladium salt may include (but is not limited to) $PdCl_2$. Thus, X in the aqueous solution may comprise a halide or pseudohalide. Some examples of pseudohalide groups include, but are not limited to, tetrafluoroborate, hexafluorophosphate, fluorosulfonate, p-toluenesulfonate, methylsulfonate and/or trifluoromethylsulfonate.

In some embodiments, the metal salt or metal complex may comprise a salt or complex of a silicide-forming metal (e.g., Ti, Ta, Cr, Mo, W, Ni, Co, Pd, or Pt, preferably Mo, W, Ni, Co, Pd, or Pt). In particularly suitable embodiments, the metal salt comprises a halide, pseudohalide, nitrate, and/or sulfate (more preferably, a halide) of such a metal.

The solvents suitable for use in the present formulation may comprise one or more organic solvents and/or water (e.g., DI water). For example, the solvent(s) may comprise a mixture of organic solvents or a mixture of an organic solvent and water having one or more characteristics or properties (such as viscosity, boiling point, evaporation rate, surface tension, etc.) adapted to facilitate coating and/or printing (e.g., printing processes such as inkjet printing, gravure printing, screen printing, offset printing, flexo-printing, microspotting, pen-coating, etc.) the formulation. Exemplary characteristics and/or properties that are considered to facilitate printing include a viscosity of at least 2 cP (e.g., 2 to 100 cP, 4 to 15 cP, or any other range of values therein), a boiling point of at least 150° C. (e.g., 150 to 250° C., or any minimum value in the range), and/or a surface tension of at least 20 dynes/cm (e.g., at least 25 dynes/cm, from 25 dynes/cm to about 100 dynes/cm, or any other minimum value in the range). Naturally, the present formulation may contain solvents that do not include such characteristics and/or properties, but preferably, at least one solvent in the formulation has at least one such characteristic and/or property.

In some embodiments, the organic solvent may comprise a $C_1$-$C_{10}$ alcohol. The $C_1$-$C_{10}$ alcohol may be a $C_1$-$C_8$ mono- or diol, which may be substituted with a $C_1$-$C_4$ alkoxy group, a $C_1$-$C_4$ alkoxy-substituted $C_1$-$C_4$ alkoxy group, a $C_6$-$C_{10}$ aryl or aryloxy group, one or more halides, an amino group, or a $C_3$-$C_5$ heterocyclic group. The amino group may be substituted with one or two $C_1$-$C_6$ alkyl, $C_6$-$C_{10}$ aryl, and/or $C_1$-$C_6$ alkanoyl groups. The heterocyclic ring may contain one or two oxygen or nitrogen atoms, and the nitrogen atoms may be substituted with a substituent as described for the amino group (e.g., in a pyrrole, oxazole, or pyrimidine ring). Furthermore, the $C_1$-$C_{10}$ alcohol may be selected from the group consisting of ethylene glycol, propylene glycol, butyl carbitol, n-propanol, isopropanol, n-butyl alcohol, isobutyl alcohol, t-butyl alcohol, n-hexanol, n-heptanol, 3-octanol, or tetrahydrofurfuryl alcohol. However, in one additional variation, the $C_1$-$C_{10}$ alcohol may comprise a $C_1$-$C_6$ alkanol, which may be selected from the group consisting of isopropanol, n-butanol, i-butanol, t-butanol, n-amyl alcohol, tert-amyl alcohol, cyclopentanol, cyclohexanol, hexanol, pinacol, benzyl alcohol, guaiacol, and n-octyl alcohol.

In an alternative embodiment, the organic solvent may comprise a polar aprotic organic solvent. The organic solvent may be present in an amount of from 5 to 99% by volume of the ink formulation (e.g., 10-95%, 20-90%, or any other range of values therein). In such an embodiment, the organic solvent may comprise a $C_1$-$C_6$ alkyl ester of a $C_1$-$C_4$ alkanoic acid (e.g., ethyl acetate or methyl acrylate), a polyether, a cyclic ether (such as tetrahydrofuran and/or dioxane), a $C_1$-$C_6$ alkane substituted with one or more polar organic groups, or a $C_1$-$C_4$ mono- or dialkylamide of a $C_1$-$C_4$ alkanoic acid, such as dimethyl formamide. In one embodiment, the organic solvent may comprises a $C_1$-$C_6$ alkyl ester of a $C_1$-$C_6$ alkanoic acid, such as a compound of the formula $C_xH_{2x+1}C(O)OC_yH_{2y+1}$, where x and y are independently 1 to 4. In another embodiment, the polyether includes di-$C_1$-$C_4$ alkoxy-substituted $C_2$-$C_8$ alkanes or mono- and/or di-$C_2$-$C_4$ alkoxy-substituted $C_2$-$C_4$ dialkyl ethers, such as dimethoxyethane (glyme), (2'-methoxyethoxy)-1-methoxyethane (diglyme), 1,2-bis-(2'-methoxyethoxy)ethane (triglyme), etc. Alternatively, the polar organic groups on the $C_1$-$C_6$ alkane may be selected from nitro, nitrile, isonitrile, cyanate, and isocyanate groups (e.g., acetonitrile, butyronitrile, isobutyronitrile and nitromethane).

In various embodiments, the organic solvent comprises a mixture of a high volatility solvent and a low volatility solvent. For example, the ink formulation may comprise a high volatility solvent in an amount of from 10 to 90% by weight of the formulation and a low volatility solvent in an amount of from 10 to 90% by weight of the formulation.

The low volatility solvent may be one that provides a relative degree of stability, that enables the ink formulation to be coated and/or printed, and/or that controls the viscosity and surface tension of the ink formulation. The low volatility solvent preferably comprises one or more relatively polar, relatively high boiling point solvents, such as $C_5$-$C_{12}$ alcohols (e.g., pentanol, hexanol, cyclohexanol, octanol, decanol, dodecanol), $C_4$-$C_{12}$ ether alcohols containing 2 to 4 oxygen atoms (butyl carbitol, tetrahydrofurfuryl alcohol, and dipropylene glycol butyl ether), polyethers, methicone solvents, amides of $C_1$-$C_4$ alkanoic acids containing up to 2 $C_1$-$C_4$ alkyl groups (formamide, dimethyl formamide), $C_2$-$C_4$ sulfoxides [e.g., dimethyl sulfoxide], cyclic esters and diesters of $C_2$-$C_{10}$ hydroxylated alkanoic acids [e.g., butyrolactone]), and mixtures thereof. The low volatility solvents are also generally those that are liquid at ambient temperatures (e.g., 15-30° C.), but which have which have a vapor pressure at 25° C. of not more than 10 torr (e.g., not more than 5 torr, 1 torr, or other maximum value less than 10 torr), and preferably, of at least 0.01 torr (e.g., at least 0.05 torr, 0.1 torr, or other minimum value greater than 0.01 torr). Alternatively, the high volatility solvents may have a boiling point at 1 atm pressure of more than 150° C. (e.g., 150° C. to 250° C., or any other range of values of at least 150° C.).

The high-volatility solvent may be one that controls the degree of spreadability (e.g., reduces spreading relative to an otherwise identical formulation that does not include the high-volatility solvent), that can tune the viscosity of the ink formulation, and/or that is generally easily and/or thoroughly removable from the formulation. The high volatility solvents are generally those that are liquid at ambient temperatures (e.g., 15-30° C.), but which have a vapor pressure at 25° C. of at least 1 torr (e.g., at least 5 torr, 10 torr, or other minimum value greater than 1 torr), and preferably, of not more than 200 torr (e.g., not more than 150 torr, 100 torr, or other maximum value less than 200 torr). Alternatively, the high volatility solvents may have a boiling point at 1 atm pressure of less than 150° C. (e.g., 120° C. or less, 100° C. or less, or any other range of values less than 150° C.). The high volatility solvent may comprise one or more relatively polar organic solvents, such as $C_1$-$C_4$ alcohols (e.g., methanol, ethanol, propanol, isopropanol, butanol), $C_1$-$C_4$ alkyl esters of $C_1$-$C_4$ alkanoic acids (e.g., ethyl acetate), $C_4$-$C_8$ ethers (e.g., diethyl ether, dibutyl ether, methyl t-butyl ether, tetrahydrofuran), $C_3$-$C_6$ ketones (e.g., acetone, methyl ethyl ketone, methyl t-butyl ketone, cyclopentanone, cyclohexanone), siloxanes [e.g., cyclo-([Me$_2$Si]O)$_3$, cyclo-([Me$_2$Si]O)$_4$, etc.], and mixtures thereof. In a preferred embodiment, the solvent comprises one or more C$_1$-C$_4$ alcohols.

In some embodiments, deionized water (or in the alternative, distilled deionized water) may be present in the solution in an amount of 1-50% by volume, 3-30% by volume, 5-25% by volume, or any other range of values therein. The amount of deionized water may be added directly to the formulation or present in aqueous HX (e.g., concentrated aqueous HX or partially diluted aqueous HX; see the discussion of the additive below). However, for the sake of simplicity, one may simply dissolve the metal salt in a predetermined amount and/or concentration of aqueous HX that is intended to be present in the final formulation (e.g., for use in printing or for sale to end users, who may then add water to the formulation prior to use).

The optional additive(s) may comprise a compound or component adapted to modify the characteristics or properties of the formulation (such as its viscosity, solvent evaporation rate, surface tension, the solubility of the metal salt or metal complex, etc., as discussed herein) to facilitate coating and/or printing (especially printing) the formulation. Additives suitable for use in the present formulation may comprise HX, NH$_4$X, a conventional surface tension reducing agent, a conventional binding agent, a conventional thickening agent, a conventional photosensitizer, a preservative, a humectant, etc. When they are present, typical amounts of these additives (other than HX and NH$_4$X) in the composition are from 0.01 wt. % to 1 wt. % (or any range of values therein) of the composition.

HX and/or NH$_4$X, which can improve the solubility of the metal salt or metal complex, may be included in the formulation as an aqueous solution, and in one example, the aqueous HX may consist essentially of concentrated HCl (e.g., about 37 wt. % HCl in deionized [DI] water). However, such an aqueous anion source will typically be present in an amount providing a molar excess of X relative to the metal. For example, if MX$_2$ is combined with aqueous HX to form "H$_2$MX$_4$," then generally the amount of aqueous HX will provide more than 2 moles of X per mole of metal atoms.

The present formulation may contain a reducing agent as an additive. For example, alcohols and aldehydes can function as reducing agents for certain metals, and as cosolvents in the formulation. Suitable alcohols may include C$_1$-C$_{12}$ alcohols and diols, and suitable aldehydes may include C$_1$-C$_{12}$ aldehydes. However, other reducing agents (e.g., including those reducing agents and solvents described herein) may also be present in the formulation as long as they do not initiate reduction at ambient temperatures (e.g., 15-25° C.) and are readily removed in the curing and/or reduction steps (e.g., they have high or low volatility, as described herein), along with the corresponding oxidized counterparts thereof. In such embodiments, the metal salt/complex reduction may occur in a subsequent heating step (e.g., at a temperature of at least 50° C., such as from 80° C. to 200° C. or any other range of values of at least 50° C.). In general, aldehydes are more reactive in such reductions than alcohols.

In further embodiments, the metal salt or metal complex and the aqueous HX may be present in amounts that provide from 1 to about 40 wt. % of the Group 4, 5, 6, 7, 8, 9, 10, 11, or 12 metal in the aqueous HX, without other additives and/or co-solvents. Alternatively or additionally, the metal salt or metal complex and the aqueous HX may be present in an amount providing from 10 to about 35 wt. % of metal, or any other range of values therein. In one implementation, the solution of metal salt in (concentrated) aqueous HX includes about 30 wt. % of palladium in an aqueous HX solution.

The present invention further relates to an ink formulation comprising an adduct and/or reaction product of a Group 4, 5, 6, 7, 8, 9, 10, 11, or 12 metal salt with HX, where X is a halide or pseudohalide, and an organic solvent or mixture of organic solvents in which the adduct and/or reaction product is soluble and which is adapted to facilitate coating and/or printing of the formulation. In a preferred embodiment, the adduct and/or reaction product comprises a reaction product of a palladium, nickel, cobalt, or platinum salt with HX. In preferred embodiments, the formulation contains less than 2% water (e.g., less than 1% water, less than 0.5% water, or any other amount under 2%). Thus, this further ink formulation may be considered relatively "anhydrous."

In the various embodiments of the "anhydrous" formulation, water is generally minimized. Accordingly, in this second formulation, when the HX-metal salt adduct and/or reaction product is first formed in aqueous HX, the water is generally removed from the formulation, either before or after adding the organic solvent(s). This may be accomplished using molecular sieves, or other methods known in the art. In an alternate embodiment, an anhydrous formulation may be made by placing the metal salt in an organic solvent and bubbling HX into the organic solvent until an adduct and/or reaction product of the metal salt and the HX is formed, then dissolves in the organic solvent.

Exemplary Methods of Making an Ink Formulation

The above-described general ink formulation, and the variations and embodiments thereof, may be made according to a method generally comprising combining one or more Group 4, 5, 6, 7, 8, 9, 10, 11, or 12 metal salt(s) and/or metal complex(es) and one or more solvents adapted to facilitate coating and/or printing of the formulation, and dissolving the metal salt or metal complex in the one or more solvents to form the formulation, the formulation consisting essentially of components that produce gaseous or volatile byproducts upon reduction of the metal salt or metal complex to an elemental metal or alloy thereof. The solvent(s) may preferably be adapted to facilitate printing (especially inkjet printing) of the formulation. In the present method of making a formulation, the Group 4, 5, 6, 7, 8, 9, 10, 11, or 12 metal salt(s) and/or metal complex(es), the anion source, the solvent(s), and the additive(s) are substantially the same as described herein for the formulation itself. Thus, in some embodiments, the method may further comprise combining an anion source adapted to facilitate dissolution of the metal salt(s) and/or metal complex(es) in the solvent(s).

If water is present (e.g., as a component of an aqueous HX additive) or added (e.g., as a co-solvent) to the formulation, the total amount of water (e.g., deionized or distilled deionized water) may vary (e.g., in an amount of from 5 to 50 wt. % of the formulation, 7 to about 30 wt. % of the formulation, or any other range of values therein). Regardless of whether water is added (but preferably when it is not), water may be subsequently removed using methods known in the art. For example, molecular sieves (or another desiccant, such as anhydrous CaSO$_4$, CaCl$_2$ or MgSO$_4$) may be added to remove the water, before or after adding the organic co-solvent(s). Alternatively, water may be removed by distilling an azeotropic mixture of water and organic solvent in the formulation (e.g., water and ethanol, n-propanol, isopropanol, t-butanol, sec-butyl alcohol, furfuryl alcohol, cyclopentanol, n-amyl alcohol, tert-amyl alcohol, n-hexyl alcohol, pinacol, benzyl alcohol, guaiacol, n-octyl alcohol, nitromethane, methyl acrylate, butyronitrile, isobutyronitrile, ethyl acetate, butyl ether, butyl ethyl ether, etc.).

In one embodiment, an amount of the Group 4, 5, 6, 7, 8, 9, 10, 11, or 12 metal salt or metal complex is dissolved in aqueous HX that provides from 1 to about 40 wt. % of the Group 4, 5, 6, 7, 8, 9, 10, 11, or 12 metal, without considering further additives and/or co-solvents. Preferably, the solution of metal compound in aqueous HX is present in an amount that provides from 10 to about 35 wt. % of the Group 4, 5, 6, 7, 8, 9, 10, 11, or 12 metal, 15 to about 30 wt. %, or any other range of values therein (e.g., 1 to about 10 wt. %, about 20 to about 40 wt. %, etc.). In one embodiment, about 30 wt. % of the Group 4, 5, 6, 7, 8, 9, 10, 11, or 12 metal (e.g., about 30 wt. % palladium) is present in the aqueous HX solution. In a preferred embodiment, X comprises chlorine, and the aqueous HX consists essentially of concentrated HCl (e.g., about 37 wt. % HCl in distilled and/or deionized water).

In various implementations, one or more additives (e.g., HX in the preceding paragraph) and/or organic solvents (e.g., in addition to the water in the aqueous HX in the preceding paragraph) may be added or combined with the metal salt or metal complex to facilitate coating and/or printing. The organic solvent may be present in varying amounts. For example, the organic solvent may be present in an amount from 5 to 99 wt. % or any range of values therein. Furthermore, the organic solvent added to the formulation may comprise any of the organic solvents described herein. For instance, the organic solvent may comprise a $C_1$-$C_{10}$ alcohol, including any of the examples previously discussed with regard to the preferred formulations (e.g., a $C_1$-$C_8$ mono- or diol, a $C_1$-$C_4$ alkoxy-substituted $C_1$-$C_6$ alkanol, a $C_1$-$C_6$ alcohol substituted with a $C_3$-$C_5$ heterocyclic group, a mono- or dialkyl-substituted amide of a $C_1$-$C_4$ alkanoic acid, etc.), or in the alternative, a polar aprotic organic solvent, such as a $C_1$-$C_6$ alkyl ester of a $C_1$-$C_4$ alkanoic acid, a cyclic ether or polyether, or dimethyl formamide (or other solvent described herein).

Furthermore, water may be removed from the formulation by adding molecular sieves to the formulation, either before or after adding the organic solvent(s). Molecular sieves are materials that contain small pores of a precise and consistent size that are used as an adsorbent for gases and liquids in a mixture. For example, the pore size is generally such that smaller molecules (e.g., water molecules) can pass through but other larger molecules cannot. Thus, the smaller water molecules are adsorbed by the molecular sieve and are thereby removed from the formulation. In various embodiments, the molecular sieves may consist of aluminosilicates, clays, glasses, ceramics, zeolites, or synthetic compounds having an open structure through which small molecules (e.g., water) can diffuse. The molecular sieves can be activated by techniques known in the art, including but not limited to high vacuum, heating, purging the atmosphere of the storage vessel with an inert gas, heating under high vacuum, and/or other combinations of such techniques.

In an alternate embodiment, an anhydrous formulation may be made by placing the metal salt in an organic solvent (as described herein), and bubbling HX into the organic solvent. Particularly when the organic solvent is one capable of dissolving (or "solvating") HX, the dissolved or solvated HX can react and/or form an adduct with the metal salt to form a soluble compound (e.g., a soluble and/or solvated $H_mMX_n$ complex, where m is the number of moles of HX per mole of metal atoms [M] in the metal salt, and n is m plus the number of moles of X atoms or ions per mole of metal salt). Once formed, such an adduct and/or reaction product can dissolve in the organic solvent, thereby forming a substantially "anhydrous" solution of metal salt-HX adduct and/or reaction product.

An Exemplary Method of Making/Printing Metal Silicides and Metal Films

A further aspect of the invention relates to a method of coating or printing a metal or metal alloy film on a substrate comprising coating or printing a formulation consisting essentially of a Group 4, 5, 6, 7, 8, 9, 10, 11, or 12 metal salt or metal complex, one or more solvents, and one or more optional additives that form gaseous or volatile byproducts upon reduction of the metal salt or metal complex to an elemental metal or alloy on the substrate; removing the solvents to form a metal-containing precursor film; and reducing the metal-containing precursor film to form the metal or metal alloy film. In general, coating refers to a process where substantially the entire surface of a substrate is covered with the formulation. Coating may comprise spin coating, inkjetting, gravure printing, flexographic printing, dip-coating, spray-coating, slit coating, extrusion coating, meniscus coating, microspotting and/or pen-coating the formulation onto the substrate.

In general, printing refers to a process for selective deposition of a liquid-based composition (e.g., a solution, suspension, emulsion, etc.) in a predetermined pattern and with a characteristic resolution (e.g., minimum layout dimension, spacing, alignment margin or error, combination thereof, etc.), including processes such as inkjet printing, gravure printing, screen printing, offset printing, flexo-printing, syringe coating, microspotting and pen-coating, although many such printing processes can also be used to form a continuous film. In a preferred embodiment, the printing step comprises inkjet printing, and the formulation may be printed in a pattern on the substrate. The present method preferably prints (especially inkjet prints) the formulation onto a substrate. In one variation, the substrate has an exposed silicon surface, and the formulation is printed onto at least part of the exposed silicon surface. In such an embodiment, portions of the metal film in contact with the exposed silicon surface may be converted to a metal silicide by annealing under conditions that form a metal silicide.

In various embodiments, as described above, the solvent(s) employed in making the formulation for forming the metal films may comprise an organic solvent, a mixture of an organic solvent and water, or a mixture of organic solvents. In these embodiments, the organic solvent may be present in an amount of from 1 to 99 wt. % of the formulation (e.g., from 25 to about 98 wt. %, from 50 to about 90%, or any other range of values therein). In the embodiment where the formulation comprises a mixture of one or more organic solvents and water, water may be present in an amount from 5 to 50 wt. % of the formulation (e.g., from about 7 to about 30% of the formulation, or any other range of values therein).

In an exemplary embodiment, the organic solvent mixture is formulated to provide a predetermined formulation viscosity, surface tension, and evaporation rate that are appropriate to facilitate coating and/or printing (especially printing) of the formulation. The organic solvent mixture may employ any of the organic solvents as described herein. For example, the organic solvent may comprise a $C_1$-$C_{10}$ alcohol and/or a polar aprotic organic solvent (as described herein). Furthermore, the organic solvent may be added in a volume (or volume ratio) sufficient to provide a viscosity of about 2 to 15 cP (e.g., 2 to 10 cP or any other range of values therein) and/or a surface tension of at least 20 dynes/cm (e.g., at least 25 dynes/cm, from 25 dynes/cm to about 100 dynes/cm, or any other value[s] in the range).

The present method may include coating or printing a formulation including water. However, water is not required to print such a formulation. In an alternate embodiment, the method comprises printing a formulation that is substantially anhydrous. For example, in such an embodiment, the formulation may contain less than 2% water, or alternatively, less than 1% water, less than 0.5% water, or less than any other maximum value less than 2%.

In general, the present coating or printing method comprises drying (or removing the solvent[s] from) the coated or printed metal precursor film. In an exemplary embodiment, the drying process comprises heating the coated or printed metal precursor film to a temperature and/or for a length of time sufficient to remove substantially all of the solvent(s). In other embodiments, drying comprises removing the solvent (s) in a vacuum, with or without applied heat. In any such embodiments, the temperature may be from 30° C. to 150° C., 50° C. to 100° C., or any value or range of values therein. The length of time may be sufficient to remove substantially all of the solvent and/or substantially all of the additive(s) from the coated or printed metal precursor film (e.g., from 1 minute to 4 hours, 5 minutes to 120 minutes, or any other range of values therein). The vacuum may be from 1 mtorr to 300 torr, 100 mtorr to 100 torr, 1-20 torr, or any other range of values therein, and may be applied by vacuum pump, aspirator, venturi tube, etc.

After coating or printing and drying, the metal-containing precursor film may be reduced by various methods. For example, the metal-containing precursor film may be exposed to a reducing agent and heated at a temperature ranging from greater than ambient temperature to about 200-400° C., depending on the substrate. Such a process has particular advantages when the substrate must be processed at a relatively low temperature (e.g., aluminum foil, a polycarbonate, polyethylene and polypropylene esters, a polyimide, etc.). A sealable oven, furnace, or rapid thermal annealing furnace configured with a vacuum source and reducing/inert gas sources may be used for providing the reducing atmosphere and heat (thermal energy) for heterogeneous reduction. In the alternative, the metal precursor film may be thermally decomposed to the elemental metal using a heat source (e.g., a hotplate) in an apparatus in which the atmosphere may be carefully controlled (e.g., a glove box or dry box).

In a preferred embodiment, the metal-containing precursor film is reduced in a liquid (e.g., hydrazine in water and/or an organic solvent, or a solution of a borane, a borohydride, an aluminum hydride [e.g., $LiAlH_4$], etc.) or an atmosphere comprising a reducing agent in the form of a vapor, gas, or plasma source (e.g., forming gas, ammonia, hydrazine vapor, a hydrogen plasma, etc.). In the case of a gas, forming gas is typical and may comprise hydrogen ($H_2$) in a carrier gas (e.g., $N_2$ and/or a noble gas such as He or Ar). In other implementations, the reducing agent may comprise a source of hydrogen (H) and another atom (or atoms) which does not significantly adversely affect the conductivity of the printed metal (e.g., $NH_3$, $N_2H_4$, and/or $SiH_4$, alone or in an inert gas, and/or optionally in the further presence of $H_2$). In the case of a plasma source, forming gas (e.g., 5-20% $H_2$ in Ar), ammonia ($NH_3$) or a nitrogen/hydrogen mixture may be ionized to create an atomic H plasma.

The metal-containing precursor film may be exposed by immersing the substrate in a reducing solution (e.g., a liquid phase reducing agent and/or a solution or mixture of a reducing agent and a liquid), preferably for a length of time sufficient to reduce substantially all of the metal salt in the printed precursor film. In such an embodiment, the reducing solution preferably comprises an amine, such as hydrazine ($H_2N$—$NH_2$), a mono-, di-, or trialkyl amine (in which the alkyl group may comprise a $C_1$-$C_8$ alkyl group), a hypophosphite (e.g., $NaH_2PO_2$) or other reducing salt, and/or a $C_1$-$C_{12}$ aldehyde, $C_1$-$C_{12}$ alcohol, or a combination thereof. The solvent may comprise water (e.g., DI water) and/or an organic solvent (e.g., as described herein; note that a $C_1$-$C_{12}$ aldehyde and/or alcohol may serve as both reducing agent and solvent). Additionally, the reducing solution may comprise a borane, a borohydride (e.g., $NaBH_4$), stannous ion (e.g. $SnCl_2$), oxalic acid, a metal hydride (e.g. $MgH_2$, $CaH_2$, LiH, etc.), $SmI_2$, a lithium aminoborohydride ($LiBH_3NR_2$, where R is as described herein), $NaBH(OAc)_3$, an oxazaborolidine (e.g. 2-methyl-CBS-oxazaborolidine), DIP-chloride or DIP-bromide, a SELECTRIDE (a borohydride reducing agent commercially available from Sigma-Aldrich Co., Milwaukee, Wis.), a borane amino complex, a superhydride solutions, a borane of the formula $BR_3$ (where R is independently H, alkyl, aryl, etc., e.g., as described herein), Tebbe reagent, ascorbic acid, citric acid, a sugar, formic acid, tannic acid, gallic acid, pyrogallic acid, an organoaluminum compound or an aluminohydride (e.g., $LiAlH_4$, a compound of the formula $AlR_3$ [where R is independently H, alkyl, aryl, etc., e.g., as described herein, such as Red-Al, DiBAlH, etc.), etc., in a polar aprotic organic solvent. In one variation, the amine or other reducing agent is present in an amount of from 0.01 to 100 wt. % of the reducing solution. When the amine comprises hydrazine, it may be present in an amount of from 0.5 to 5 wt. % of the reducing solution (or any range of values therein). In various embodiments, the reducing process may comprise immersing the substrate with the dried, coated or printed metal salt thereon into the reducing solution. The substrate may be rotated in the reducing solution. In some embodiments, the substrate may be immersed in a heated reducing solution (e.g., at a temperature of from 30° C. to 100° C.), or in the alternative, the reducing solution may be heating after the substrate is immersed therein. Alternatively, the reducing solution may be sprayed on or otherwise coated onto the dried metal precursor film/coating. Vapors of liquid-phase reducing agents can also reduce the metal-containing precursor film, as described above.

The substrate and metal film may then be cured (e.g., by annealing) at a temperature sufficiently high and/or for a time sufficiently long to form a more conductive elemental metal (e.g., Pd(0) having at least a predetermined minimum conductivity) or a metal silicide (e.g., $Pd_2Si$). A metal or metal silicide will be formed depending on the temperature of the annealing process. For example, in one variation, the annealing temperature for forming the metal from the reduced metal-containing precursor film may range from 120 to 300° C. (e.g., from about 150 to about 250° C., or any temperature or range of temperatures therein). However, with possible improvements in purity, print processing, film morphology, etc., the annealing temperature for forming metal films having relatively higher conductivity can be reduced to less than 100° C., and possibly even at ambient temperatures (e.g., about 25° C.).

In another variation, the temperature for forming the metal silicide may range from 200 to 1000° C. (e.g., from about 600 to about 800° C., or any temperature [e.g., about 700° C.] or range of temperatures therein). The curing and silicidation processes can occur in separate steps, or combined in a single processing step, as they are not mutually exclusive. Furthermore, under optimum conditions (e.g., a highly reactive metal, an absence of contaminants in the formulation, a relatively ideal film morphology, etc.), annealing temperatures may be reduced to as low as 190° C. for forming the metal silicide (e.g., $Pd_2Si$).

The patterned metal films may have very broad dimension ranges. Depending on the application (e.g., use in photovoltaic [PV] or solar cells, sensors, capacitors, metal traces in printed integrated circuits, and/or use as seed layer for plating other metals), the printed features can be quite small or quite large. Accordingly, in various embodiments, the patterned metal films may comprise a two-dimensional array of lines, features or other shapes having a width of from 100 nm to 10,000 µm (e.g., 0.5 µm to 1,000 µm, 1 µm to 100 µm, or any other range of values therein). In some embodiments, the features or shapes may have a length of from 1 µm to 50,000 µm (e.g., 2 µm to 10,000 µm, 5 µm to 1000 µm, or any other range of values therein). The film thicknesses may range from 0.001 µm to 1000 µm (e.g., 0.01 µm to 500 µm, 0.05 µm to 250 µm, or any other range of values therein).

In some embodiments, the metal ink may be printed (e.g., by inkjetting) and/or coated (e.g., by spin-coating, spray-coating, slit coating, extrusion coating, dip coating, meniscus coating, etc.) onto a silicon surface such as a silicon substrate or a patterned silicon film on a substrate. The printed or coated metal precursor may then be annealed in forming gas at temperatures ranging from about 150° C. to about 800° C., or any temperature or range of temperatures therein, to form a metal silicide.

In further embodiments, the dried, reduced and cured metal ink film (which may, optionally, be partially silicided) may provide a seed layer for further selective deposition of a bulk conductor thereon (e.g., by electroplating or electroless plating, preferably electroless plating). Consequently, the method may further comprise selectively depositing a bulk conductor on the metal film. The bulk conductor may be selected from the group consisting of Al, Co, Ni, Cu, Ag, Au, Pd, and Pt. In the preferred embodiment, electroless plating comprises immersing the substrate with the printed metal film thereon into an electroless plating solution of an interconnect metal (e.g., the bulk conductor) to form a conductive layer on the printed metal film. The electroless plating solution of the interconnect metal and/or the bulk conductor is generally conventional, although the film on which the interconnect metal and/or bulk conductor is plated is not.

Furthermore, the seed layer (e.g., a dried, reduced and optionally cured metal ink pattern) may selectively form a silicide in areas where it is in contact with underlying silicon (e.g., heavily doped silicon). These areas generally constitute electrodes of thin film devices (e.g., gate, source, drain, capacitor plate, diode layer, etc.), and thus the silicide provides electrical contact. According to this embodiment, the contacts and the local interconnects (and optionally, longer range metallization as well) can be printed in a single printing step that includes printing and reducing the seed layer, electro(less) plating of the bulk conductor, and silicide formation (the latter two of which can be performed in either order).

EXAMPLES

Formation of Elemental Palladium from a Palladium Precursor

Inks were formulated by dissolving $PdCl_2$ in a minimum amount of concentrated aqueous HCl (37%), generally sufficient to provide a mass loading of 30% Pd in the concentrated HCl (i.e., containing sufficient $PdCl_2$ to form or provide a solution containing 30 wt. % of Pd), then adding one or more organic solvents, and optionally, water to provide an ink containing from 2 to 8 wt. % Pd. The following specific formulations were made:

$PdCl_2$ in water, 4 wt. % palladium
$PdCl_2$ in water/butyl carbitol (50:50), 4 wt. % and 8 wt. % palladium
$PdCl_2$ in water/butyl carbitol (30:70), 8 wt. % palladium
$PdCl_2$ in water/butyl carbitol (70:30), 8 wt. % palladium
$PdCl_2$ in water/butyl carbitol (22:78), 6 wt. % palladium
$PdCl_2$ in water/butyl carbitol (15:85), 4 wt. % palladium
$PdCl_2$ in water/butyl carbitol (7:93), 2 wt. % palladium
$PdCl_2$ in water/ethylene glycol (50:50), 4 wt. % palladium
$PdCl_2$ in water/ethyl acetate/butyl carbitol (30:50:20), 8 wt. % palladium
$PdCl_2$ in water/isopropanol/butyl carbitol (30:50:20), 8 wt. % palladium
$PdCl_2$ in water/tetrahydrofurfuryl alcohol/butyl carbitol (30:50:20), 8 wt. % palladium
$PdCl_2$ in water/tetrahydrofurfuryl alcohol/butyl carbitol (7:70:23), 2 wt. % palladium
$PdCl_2$ in water/tetrahydrofurfuryl alcohol/butyl carbitol (7:46.5:46.5), 2 wt. % palladium
$PdCl_2$ in water/tetrahydrofurfuryl alcohol/butyl carbitol (7:23:70), 2 wt. % palladium
$PdCl_2$ in water/tetrahydrofurfuryl alcohol (50:50), 8 wt. % palladium
$PdCl_2$ in water/tetrahydrofurfuryl alcohol (15:85), 4 wt. % palladium
$PdCl_2$ in water/tetrahydrofurfuryl alcohol (7:93), 2 wt. % palladium
$PdCl_2$ in water/ethylene glycol (40:60), 2 wt. % palladium
$PdCl_2$ in water/ethylene glycol (40:60), 5 wt. % palladium
$PdCl_2$ in water/1-hexanol (7.5:92.5), 2 wt. % palladium
$PdCl_2$ in water/tetrahydrofurfuryl alcohol (7.5:92.5), 2 wt. % palladium In the alternative, two methods can be applied to make "water free" ink. In a first method, water can be removed (e.g., using molecular sieves) from a stock solution containing about 30 wt. % Pd in concentrated aqueous HCl, as described in paragraph [0063] above to obtain a brown powder. This dry powder is soluble in polar organic solvents, such as butyl carbitol, tetrahydrofurfuryl alcohol, 3-octanol, ethylene glycol, etc., although the solubility may be limited in some solvents. This important property allows the formulation of "water free" $PdCl_2$ inks in the above mentioned solvents. These inks retain the ability to form elemental palladium upon being printed or coated, dried and exposed to reducing atmospheres or dipped in reducing solutions and can be used to form silicides or function as a seed layer for electroless plating. These formulations generally show significant improvements in inkjet stability and printing capabilities when compared to water-containing inks. In the present example, the composition of the dry powder was not specifically determined, although it has been designated as "$H_2PdCl_4$" for the purposes of the testing process (although this formula may not correspond to the actual composition of the powder).

In a second method, a "water-free" formulation was made by removing water in the final ink formulation. As described in paragraph [0063], after formulating a water-containing ink using the stock solution of 30% Pd in concentrated HCl, diluted with one or more organic solvents (as specified below), the water was removed by adding molecular sieves and allowing the formulation to stand overnight. Consequently, the water level in the ink was reduced to 0.1 wt. % from about 20 wt. %. The following are specific formulations made according to the two methods.

PdCl$_2$ 2~4 wt. % in 3-octanol
PdCl$_2$ 2~4 wt. % in heptanol
PdCl$_2$ 2~4 wt. % in hexanol
PdCl$_2$ 2~4 wt. % in tetrahydrofurfuryl alcohol
PdCl$_2$ 2 wt. % in butyl carbitol
PdCl$_2$ 1-hexanol, 4 wt. % palladium
PdCl$_2$ 1-hexanol, 2 wt. % palladium The inks were tested by spincoating onto polycrystalline silicon thin films. Although polycrystalline silicon thin films were used in this test, the silicon surface may comprise amorphous silicon or silicon deposited onto an oxide (e.g., silicon dioxide). In each case, the silicon thin film can be doped or undoped. The silicon thin film (70 nm thick) was deposited by low pressure chemical vapor deposition and crystallized in a furnace. The silicon surface was cleaned in dilute aqueous HF (50:1 DI water:concentrated aqueous HF) to remove native oxide and any additional oxide grown during crystallization, and then dipped in aqueous H$_2$O$_2$ to create a uniform chemical oxide (about 8-10 Å thick). Alternately, the silicon surface can be cleaned with dilute aqueous HF (500:1 DI water: concentrated aqueous HF), followed by oxide growth by exposure to aqueous H$_2$O$_2$.

After spin coating the exemplary inks onto polycrystalline silicon thin films, the films were dried (soft cured) at 150° C. in air on a hot surface (e.g., a hot plate) to remove the solvent. Subsequently, the samples were annealed at 650° C. in the presence of forming gas for 120 minutes to create Pd$_2$Si. The formation of Pd$_2$Si was observed and confirmed using powder x-ray diffraction (XRD). The XRD data was collected from tests performed on palladium films from (1) a commercially available source (i.e., an Emulsitone formulation comprising PdCl$_2$ in water with HCl, and an additional proprietary polymer added to improve spin coating uniformity), (2) a PdCl$_2$ ink in ethylene glycol, and (3) a PdCl$_2$ ink in diethylene glycol butyl ether. Not all of the elemental Pd was converted to palladium silicide, and therefore the presence of elemental palladium (i.e., three Pd peaks) is evident in FIG. 1 for each of the samples tested.

Reducing PdCl$_2$ to Elemental Palladium without Use of Forming Gas

A PdCl$_2$ ink (i.e., 2 wt. % Pd in 1-hexanol, prepared according to paragraph [0064] above) was printed and/or patterned onto a substrate and dried at a relatively low temperature (e.g., 150° C.) to remove the solvent. The substrate was then dipped in a diluted reducing solution (e.g., 1 wt. % hydrazine, NaBH$_4$, NaH$_2$PO$_2$, etc., in water and/or a C$_1$-C$_4$ alcohol). During this process, PdCl$_2$ was reduced to elemental palladium (likely in the form of nanoparticles). Afterward, the sample was dipped in an electroless plating bath (e.g., of a platinum, palladium or silver precursor) to form a metal film.

Alternatively, the patterned and dried PdCl$_2$ film can be directly immersed into an electroless plating bath if the PdCl$_2$ (or the plating bath) contains a reducing agent that is strong enough for reducing PdCl$_2$ to elemental palladium. Preferably, by using a separate reducing bath, the potential contamination from PdCl$_2$ and reduction byproducts can be avoided.

Reducing PdCl$_2$ to Elemental Palladium with Forming Gas

The coated/printed and dried PdCl$_2$ was exposed to forming gas (e.g., 5% H$_2$ in Ar) at room temperature (or higher, if desired, but generally less than the maximum processing temperature for the substrate; e.g., about 200° C. for plastic substrates such as polyethylene terephalate (PET) or PEN) to reduce the PdCl$_2$ to elemental palladium.

CONCLUSION/SUMMARY

Thus, the present invention provides printable metal formulations made from metal ink precursors (preferably palladium, nickel, cobalt, or platinum), methods of forming the printable formulations, and methods of forming thin films from the printable metal formulations (e.g., metal precursor inks). Selectively depositing a metal precursor ink (e.g., a palladium precursor, such as PdCl$_2$) formulation on only the areas of an electronic device (e.g., a TFT, diode, capacitor, PV cell, sensor, etc.) where a metal silicide is desired, or alternatively, printing the ink formulation over the device (but not onto the entire substrate) and then selectively removing the relatively small amounts of excess metal not converted to silicide, enhances the advantages of an all-printed process. Some of these advantages include a decreased number of processing steps, reduced consumption and/or loss of relatively expensive metal (e.g., palladium or platinum), and a potential reduction in any need to employ incompatible processing (e.g., palladium etching).

In one particular embodiment, the formulations and methods of the present invention form palladium silicides from palladium precursors. In many cases, palladium silicides are preferable to other silicide-forming metals because they can be formed even in the presence of a native or chemical oxide on the silicon surface and therefore processing may be simplified. Furthermore, the methods of the present invention advantageously enable the use of PdCl$_2$ inks for printing seed layers for subsequent electroless plating of metals on non-conductive substrates.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A formulation, consisting essentially of:
   a) one or more salts and/or complexes of a silicide forming Group 4, 5, 6, 7, 8, 9, 10, 11, or 12 metal salts and/or metal
   b) one or more organic solvents adapted to facilitate coating and/or printing of the formulation, the organic solvent(s) being present in an amount of at least 50% by volume of the formulation, wherein at least 20% by volume of the formulation is a low volatility solvent having a viscosity of at least 2 cP, a boiling point of at least 150 ° C., and a surface tension of at least 20 dynes/cm; and
   c) one or more anion source additives that are selected from the group consisting of HX and NH$_4$X, where X is a halide, nitrate, sulfate, formate, acetate, cyanate, isocyanate and/or alkoxide;
   wherein each component of said formulation, including said salt(s) and/or complex(es) of said silicide forming Group 4, 5, 6, 7, 8, 9, 10, 11, or 12 metal, said solvent(s), and said anion source additive(s) form gaseous or volatile byproducts upon reduction of the salt(s) and/or complex(es) of said silicide forming Group 4, 5, 6, 7, 8, 9, 10, 11, or 12 metal in the formulation to an elemental metal and/or alloy thereof.

2. The formulation of claim 1, wherein said salt(s) and/or complex(es) of said silicide forming Group 4, 5, 6, 7, 8, 9, 10, 11, or 12 metal has the formula $MX_n$ or $M(L)_p X_n$, where M is the silicide forming Group 4, 5, 6, 7, 8, 9, 10, 11, or 12 metal; X is a halide, pseudohalide, nitrate, sulfate, formate, acetate, cyanate, isocyanate, alkoxide and/or diketonate; n is equal to a formal charge of M plus any associated cations that are present, divided by a formal charge of X; L is selected from the group consisting of $NH_3$, $H_2O$, CO, NO, $N_2$, $H_2S$, $C_2H_4$, $C_6H_6$, CN, NC, $PH_3$, $PF_3$, and volatile 0- and/or N-containing organic solvents;

and p is an integer equal to a number of coordination sites on M, minus the coordination sites occupied by $X_n$.

3. The formulation of claim 1, wherein X is chloride.

4. The formulation of claim 1, wherein said solvent comprises $H_2O$, an organic solvent, a mixture of $H_2O$ and organic solvent(s), or a mixture of organic solvents.

5. The formulation of claim 1, wherein said silicide forming Group 4, 5, 6, 7, 8, 9, 10, 11, or 12 metal is selected from the group consisting of Ti, Ta, W, Mo, Cr, Pd, Pt, Ni, and Co.

6. The formulation of claim 1, wherein said salt(s) and/or complex(es) of said silicide forming Group 4, 5, 6, 7, 8, 9, 10, 11, or 12 metal comprises a palladium, nickel, cobalt, or platinum salt.

7. The formulation of claim 6, wherein said palladium, nickel, cobalt, or platinum salt comprises a palladium salt, and said palladium salt comprises a palladium halide, a palladium pseudohalide, palladium nitrate, or palladium sulfate.

8. The formulation of claim 1, wherein said salt(s) and/or complex(es) of said silicide forming Group 4, 5, 6, 7, 8, 9, 10, 11, or 12 metal comprises a Group 8, 9, 10, 11, or 12 metal halide, pseudohalide, nitrate, sulfate.

9. The formulation of claim 1, wherein said formulation is substantially anhydrous.

10. The formulation of claim 1, wherein said salt(s) and/or complex(es) of said silicide forming Group 4, 5, 6, 7, 8, 9, 10, 11, or 12 metal are present in an amount of from 1 to 30% by weight of said formulation.

11. A method of making a metal-containing formulation, comprising:
a) combining one or more salts and/or complexes of a silicide forming Group 4, 5, 6, 7, 8, 9, 10, 11, or 12 metal and one or more organic solvents adapted to facilitate coating and/or printing of said formulation, the organic solvent(s) being present in an amount of at least 50% by volume of the formulation, wherein at least 20% by volume of the formulation is a low volatility solvent having a viscosity of at least 2 cP, a boiling point of at least 150° C., and a surface tension of at least 20 dynes/cm; and
b) dissolving in said one or more solvents said salt(s) and/or complex(es) of said silicide forming Group 4, 5, 6, 7, 8, 9, 10, 11, or 12 metal and one or more anion source additives selected from the group consisting of HX and $NH_4X$ to form the formulation, where X is a halide, nitrate, sulfate, formate, acetate, cyanate, isocyanate, and/or alkoxide, and said formulation consists essentially of components that produce gaseous or volatile byproducts upon reduction of the metal salt(s) and/or metal complex(es) in the formulation to an elemental metal or alloy thereof.

12. The method of claim 11, wherein said salt(s) and/or complex(es) of said silicide forming Group 4, 5, 6, 7, 8, 9, 10, 11, or 12 metal has the formula $MX_n$ or $M(L)_p X_n$, where M is the silicide forming Group 4, 5, 6, 7, 8, 9, 10, 11, or 12 metal, X is a halide, pseudohalide, nitrate, sulfate, formate, acetate, cyanate, isocyanate, alkoxide and/or diketonate; n is equal to a formal charge of M divided by a formal charge of X, L is selected from the group consisting of $NH_3$, $H_2O$, CO, NO, $N_2$, $H_2S$, $C_2H_4$, $C_6H_6$, CN, NC, $PH_3$, $PF_3$, and volatile 0- and/or N-containing organic solvents; and p is an integer equal to a number of coordination sites on M, minus the coordination sites occupied by $X_n$.

13. The method of claim 11, wherein X is Cl.

14. The method of claim 11, wherein said solvent comprises $H_2O$, an organic solvent, a mixture of $H_2O$ and organic solvent(s), or a mixture of organic solvents.

15. The method of claim 11, wherein said silicide forming Group 4, 5, 6, 7, 8, 9, 10, 11, or 12 metal is selected from the group consisting of Ti, Ta, W, Mo, Cr, Pd, Pt, Ni, and Co.

16. The method of claim 12, wherein said salt(s) and/or complex(es) of said silicide forming Group 4, 5, 6, 7, 8, 9, 10, 11, or 12 metal salt(s) and/or metal comprises a palladium, nickel, cobalt, or platinum salt.

17. The method of claim 16, wherein said palladium, nickel, cobalt, or platinum metal salt comprises a palladium salt, and said palladium salt comprises a palladium halide, a palladium pseudohalide, palladium nitrate, or palladium sulfate.

18. The method of claim 11, further comprising removing water from the formulation.

19. The method of claim 11, wherein said salt(s) and/or complex(es) of said silicide forming Group 4, 5, 6, 7, 8, 9, 10, 11, or 12 metal are present in an amount of from 1 to 30% by weight of said formulation.

20. A method of printing a metal or metal alloy film on a substrate, comprising:
a) coating or printing a formulation onto at least part of an exposed silicon-containing surface of said substrate, the formulation consisting essentially of (i) one or more salts and/or complexes of a silicide forming Group 4, 5, 6, 7, 8, 9, 10, 11, or 12 metal, (ii) one or more organic solvents, and (iii) one or more anion source additives selected from the group consisting of HX and $NH_4X$ to form the formulation, where X is a halide, nitrate, sulfate, formate, acetate, cyanate, isocyanate, and/or alkoxide, the organic solvent(s) are present in an amount of at least 50% by volume of the formulation, at least 20% by volume of the formulation is a low volatility solvent having a viscosity of at least 2 cP, a boiling point of at least 150° C., and a surface tension of at least 20 dynes/cm, and each component of the formulation, including said salt(s) and/or complex(es) of said silicide forming Group 4, 5, 6, 7, 8, 9, 10, 11, or 12 metal, said solvent(s), and said anion source additive(s) form gaseous or volatile byproducts upon reduction of the metal salt(s) and/or metal complex(es) to an elemental metal or alloy thereof;
b) removing said one or more solvents to form a metal-containing precursor film;
c) reducing said metal-containing precursor film to form said metal or metal alloy film; and
d) annealing the substrate and said metal or metal alloy film at a temperature sufficiently high and for a time sufficiently long to form a metal.

21. The method of claim 20, wherein coating or printing said formulation comprises inkjet printing said formulation.

22. The method of claim 20, wherein said formulation preferentially wets said exposed silicon surface.

23. The method of claim 20, wherein said silicide forming Group 4, 5, 6, 7, 8, 9, 10, 11, or 12 metal is selected from the group consisting of Ti, Ta, W, Mo, Cr, Pd, Pt, Ni, and Co.

24. The method of claim 20, wherein reducing said metal-containing precursor film comprises exposing said metal-containing precursor film to a reducing agent for a length of time sufficient to form said metal film.

25. The method of claim 24, wherein said reducing agent comprises hydrogen gas, ammonia, a silane gas, hydrazine, a mono-, di-, or trialkyl amine, a hypophosphite, a $C_1$-$C_{12}$ aldehyde, a $C_1$-$C_{12}$ alcohol, a borohydride or an aluminohydride.

26. The method of claim 25, wherein said reducing agent comprises $H_2$, $NH_3$ or hydrazine.

27. The method of claim 24, wherein exposing said metal-containing precursor film comprises heating said metal-containing precursor film in a gas or atmosphere comprising said reducing agent.

28. The method of claim 24, wherein exposing said metal-containing precursor film comprises immersing the substrate in a reducing solution.

29. The method of claim 24, wherein said reducing agent forms substantially only gaseous or volatile byproducts upon reduction of the metal salt or metal complex to the elemental metal or alloy.

30. The method of claim 20, wherein said salt(s) and/or complex(es) of said silicide forming Group 4, 5, 6, 7, 8, 9, 10, 11, or 12 metal comprises a palladium, nickel, cobalt, or platinum salt.

31. The method of claim 30, wherein said metal palladium, nickel, cobalt, or platinum salt(s) and/or metal complex(es) comprises a palladium salt, and said palladium salt comprises a palladium halide, a palladium pseudohalide, palladium nitrate, or palladium sulfate.

32. The method of claim 20, further comprising selectively depositing a bulk conductor on said metal film.

33. The method of claim 32, wherein said bulk conductor is selected from the group consisting of Al, Co, Ni, Cu, Ag, Au, Pd, and Pt.

34. The method of claim 32, wherein selectively depositing said bulk conductor comprises electroless plating.

35. The method of claim 34, wherein electroless plating comprises immersing said substrate with said printed metal film thereon into an electroless plating solution of an interconnect metal to form a conductive layer thereon.

36. The method of claim 32, further comprising selectively forming a silicide in regions wherein said metal film contacts areas of underlying silicon.

37. The method of claim 20, wherein said Group 4, 5, 6, 7, 8, 9, 10, 11, or 12 metal salt(s) and/or metal complex(es) has the formula $MX_n$ or $M(L)_p X_n$, where M is the Group 4, 5, 6, 7, 8, 9, 10, 11, or 12 metal; X is a halide, pseudohalide, nitrate, sulfate, formate, acetate, cyanate, isocyanate, alkoxide and/or diketonate; n is equal to a formal charge of M plus any associated cations that are present, divided by a formal charge of X; L is selected from the group consisting of $NH_3$, $H_2O$, CO, NO, $N_2$, $H_2S$, $C_2H_4$, $C_6H_6$, CN, NC, $PH_3$, $PF_3$, and volatile O- and/or N-containing organic solvents; and p is an integer equal to a number of coordination sites on M, minus the coordination sites occupied by $X_n$.

38. The method of claim 20, wherein X is chloride.

39. The method of claim 20, wherein said Group 4, 5, 6, 7, 8, 9, 10, 11, or 12 metal salt(s) and/or metal complex(es) is present in an amount of from 1 to 30% by weight of said formulation.

* * * * *